E. I. ENGEL 3,371,746

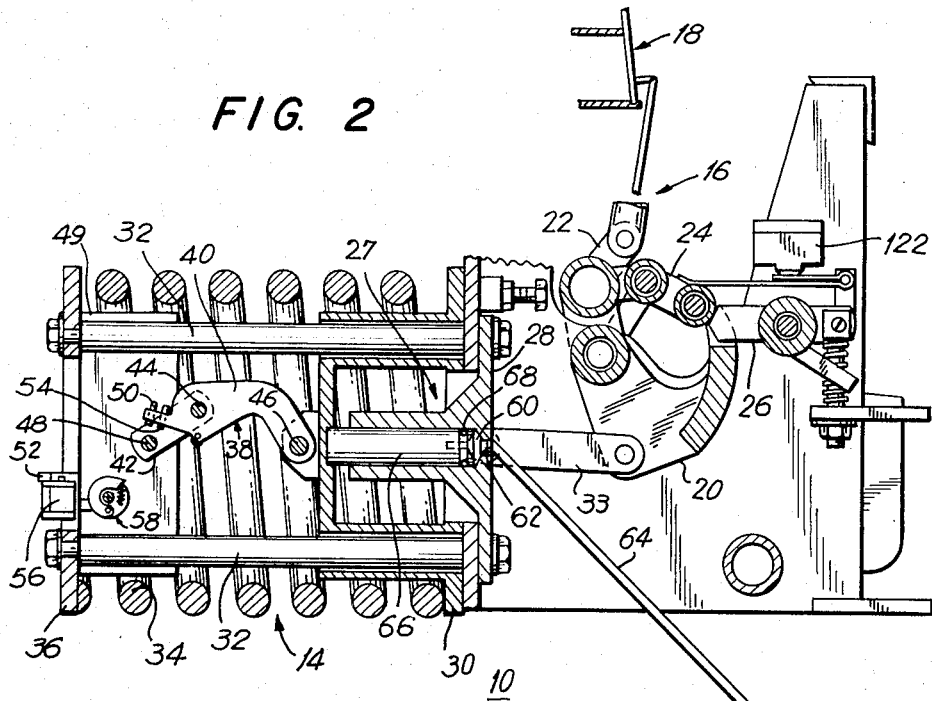
FIG. 2
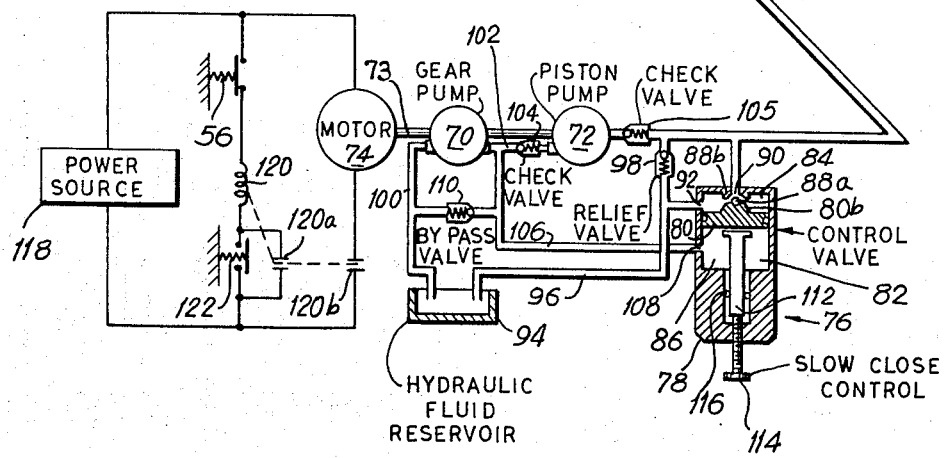
INVENTOR
EDWARD I. ENGEL
BY
Richard M. Rabkin
ATTORNEY March 5, 1968

ENERGY STORAGE MECHANISM FOR ACTUATING
CIRCUIT BREAKERS AND THE LIKE

Filed July 26, 1966

INVENTOR
EDWARD I. ENGEL

BY
*Richard M. Rabkin*
ATTORNEY

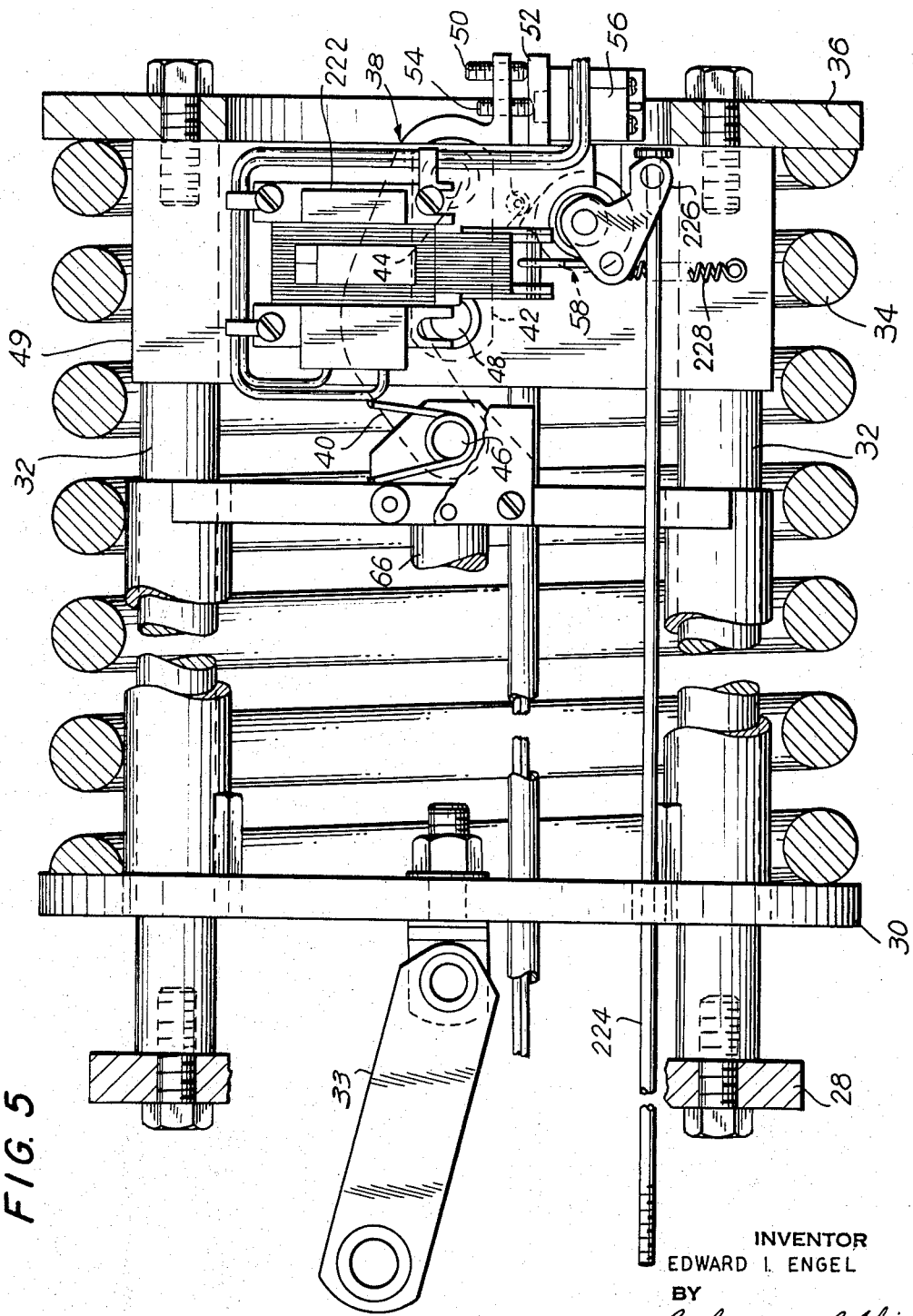

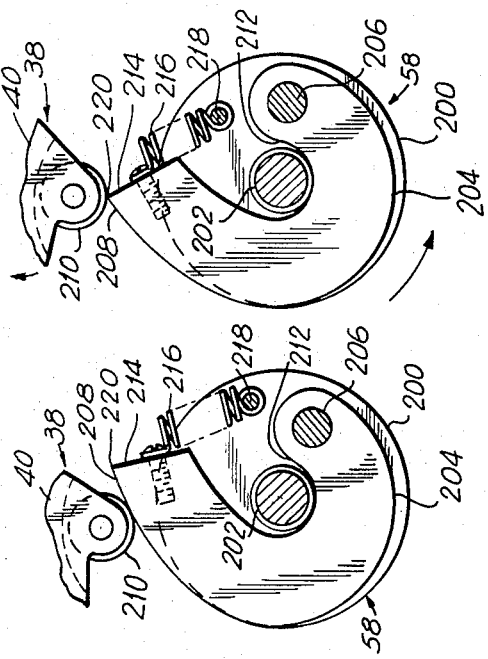

United States Patent Office 3,371,746
Patented Mar. 5, 1968

3,371,746
ENERGY STORAGE MECHANISM FOR ACTUATING CIRCUIT BREAKERS AND THE LIKE
Edward I. Engel, Matawan, N.J., assignor to Federal Pacific Electric Company, a corporation of Delaware
Filed July 26, 1966, Ser. No. 567,960
6 Claims. (Cl. 185—37)

This invention relates to energy storage mechanisms and more particularly to an energy storage mechanism for actuating circuit breakers and the like.

The use of stored energy mechanisms for actuating circuit breakers and the like is well known in the art. Many mechanisms of various types and degrees of sophistication have been suggested and have met with varying success. The basic requirement of all such mechanisms is the ability to store small amounts of energy, available over a relatively long period of time, and to deliver the stored energy in a relatively short period of time. Where, as in circuit breakers for use at 600 volts and less, a small amount of stored energy was required, mechanical means utilizing a motor driven pawl and ratchet arrangement have been successfully employed. Such a construction is illustrated in Patent No. 3,097,275 entitled Circuit Interrupters which is assigned to the same assignee as the present invention. However, where considerably larger amounts of stored energy were required, as for closing circuit breakers in the 5 to 15 kilovolt service range, the art turned to the use of hydraulic or hydropneumatic accumulators. In such hydraulic mechanisms the hydraulic fluid system is pressurized and is used either directly or indirectly to cause operation of the circuit breaker. A piston of the hydraulic system is directly connected to the operating linkage of the circuit breaker in the direct mechanism and the fluid pressure in the system operates the breaker; in the indirect system a stored energy spring is charged by the hydraulic system and the stored energy is subsequently used to operate the breaker linkage. An object of this invention is to provide an improved, novel, and compact stored energy system for operating circuit breakers and the like.

Where stored energy means are utilized for closing circuit breakers and the like prevention of "pumping" or successive unintentional discharges of the energy storage means is of importance. It is yet another object of this invention to provide a stored energy mechanism incorporating improved anti-pumping means.

The above and other objects and advantages of the invention are accomplished in one embodiment of the invention wherein an energy storage mechanism is provided which includes an energy storage spring having a given volume in the discharged condition thereof and wherein the operative mechanism for transmitting the energy to be stored in the spring, the means for releasably restraining the spring in its charged condition, and the means for releasing the restraining means are all accommodated within the given volume.

The nature of the invention and its various further aspects and features of novelty will be appreciated from the illustrative disclosure that is given in detail below, and from the accompanying drawings which form part of this disclosure.

In the drawings:

FIG. 2 is a diagrammatic representation of the embodiment of the invention of FIG. 1 in which the energy storage mechanism is shown at the start of the charging cycle and the circuit breaker is shown closed;

FIG. 5 is a side elevation, in partial section and with some parts broken away and others omitted in the interest of clarity, of the stored energy mechanism;

FIGS. 6 to 10 are sequential elevational views of the stored energy releasing means, in particular FIG. 6 illustrates the start or reset portion;

FIG. 7 illustrates the release position; and

FIGS. 8, 9 and 10 illustrate the intermediate reset positions.

Figure 1:
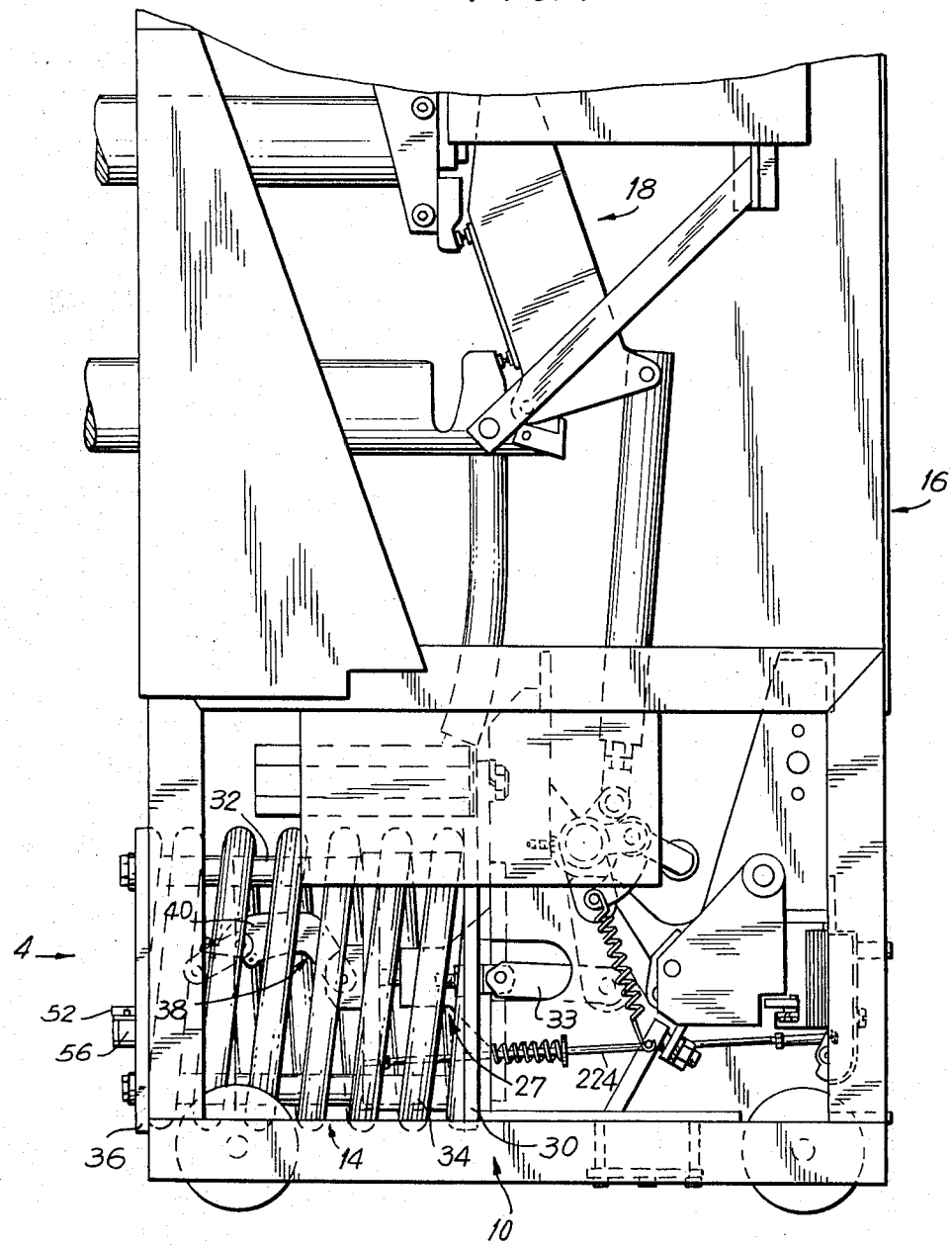
FIG. 1 is a side elevation of a circuit breaker including a stored energy operating mechanism according to the teachings of the invention.
Figure 3:
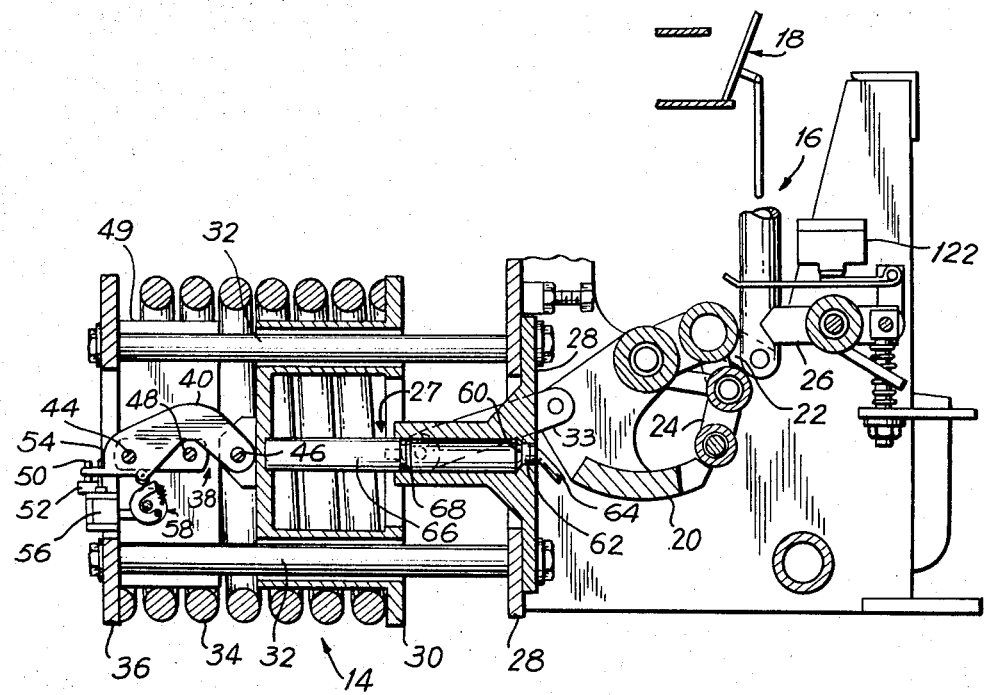
FIG. 3 is a similar view in which the energy storage mechanism is shown in its fully charged condition and the circuit breaker is open and ready to be closed.

Referring to the drawings, the stored energy mechanism 10 comprising a multi-stage hydraulic pressurizing system 12 and an energy storage system 14 is illustrated in association with a circuit breaker 16. A similar circuit breaker having the same linkage system but which employs a solenoid type closing mechanism is shown and described in detail in U.S. Patent No. 2,943,168 which is assigned to the assignee of the present invention. Circuit breaker 16 is multi-pole and has a plurality of contact pairs 18 which close under drive impetus supplied, in the present invention, by the stored energy mechanism 10. The linkage of the circuit breaker includes a driving member 20 operatively connected to the stored energy mechanism 10, a driven member 22 connected to the movable contacts and a controlled latch 24 coupling the driving and driven members to each other in a trip-free relationship. The controlled latch 24 is engaged by a prop 26 to hold the operating mechanism "closed." Further discussion of the circuit breaker mechanism is not believed to be necessary to the understanding of the present invention and will therefore be omitted in the interest of brevity.

The energy storage system 14 is mounted on the frame of the circuit breaker and includes a hydraulic jack 27 which has its housing 28 secured to the frame. A spring carriage 30 is mounted on a pair of rods 32 attached to the frame for reciprocating movement therealong. Carriage 30 is connected to driving member 20 by a pair of spaced links 33 (only one shown) that straddle the jack housing and pass through appropriate apertures in the frame. A heavy coil spring 34 is constrained between the carriage 30 and a retainer cap 36 secured to the remote ends of the rods 32. An overcentering toggle 38 is provided for releasably restraining the carriage 30 in the charged condition of spring 34 (FIG. 2). Toggle 38, which is positioned within the volume defined by the coil spring 34, cap 36 and cylinder member 28 is comprised of two links, 40 and 42, which are connected at a knee 44. Link 40 is pivoted at 46 to the carriage 30 and link 42 is pivoted on shaft 48 which is supported by plates 49 attached to rods 32 (only one shown). As carriage 30 moves toward end cap 36 during the process of charging the spring, as will be explained in greater detail below, the knee 44 of the toggle moves counterclockwise about pivot 48. Shortly after the knee 44 passes overcenter (FIG. 2) an adjustment pin 50 carried by link 40 engages a stop 52 carried by plates 49 and arrests further movement of the knee in the charging direction. Simultaneously, a second pin 54 actuates a switch 56. A release mechanism 58, is provided for shifting the toggle overcenter from the position shown in FIG. 2 when the energy previously stored in the spring 34 is to be released. Release mechanism 58 will be described in greater detail below.

Jack housing 28 has a central bore or cylinder with a single port 62. Port 62 is connected by hydraulic line or passageway 64 to the hydraulic fluid pressurizing system 12. A piston member or ram 66 is secured at one end to the spring carriage 30 and is slidable in the bore 60. Seal 68 on the ram engages the inner surfaces of the bore 60 and retains the hydraulic fluid.

The hydraulic fluid pressurizing system 12 includes a two-stage pumping system comprising a relatively low pressure (for example, 300 p.s.i.) gear pump 70 and a relatively high pressure (for example, 4000 p.s.i.) piston pump 72 that are connected by shaft 73 to the same electric drive motor 74 for simultaneous operation. Well known relatively incompressible hydraulic oil is used as the force transmitting medium in the preferred embodiment of the invention. Control valve 76 is used to control the delivery of high pressure fluid from piston pump 72 to the jack 27 and, as will be explained below, selectively controls the egress of the fluid from the jack during the breaker closing operation. The valve housing 78 contains a movable piston 80 which separates portions of the bore 82 to form two chambers, i.e., vented chamber 84 and low pressure chamber 86. The piston 80 has a broad face 80a forming one wall of the low pressure chamber 86 and has an oppositely disposed face 80b in the vented chamber 84. Face 80b carries a ball valve member 88a. Ball valve member 88a cooperates with a wall mounted valve seat 88b to form a valve which is able to selectively close off high pressure port 90 that communicates with the conduit 64 that connects the pressurizing system 12 and jack 27. A second port 92 in the vented chamber 84 connects the valve to the hydraulic fluid reservoir 94 through passageway or conduit 96. A high pressure relief valve 98 vents conduit 64 to the reservoir 94 through conduit 96.

Gear pump 70 draws hydraulic fluid from the reservoir 94 through conduit 100. The low pressure fluid from gear pump 70 is driven through conduit 102 to the input of the piston pump 72. Check valves 104, 105 are positioned in conduits 102 and 64, respectively. Valve 104 prevents return flow during pumping and valve 105 prevents return flow during pumping and when the piston pump is not driven by motor 74. Branch conduit 104 connects conduit 102, between the check valve 106 and the gear pump 70, to the low pressure chamber 86 of the control valve through port 108. Bypass valve 110 vents conduit 106 to the reservoir 94 through conduit 100 in the event that excessive pressure should appear in conduit 106.

Control valve 76 is provided with means for selectively controlling the position of floating piston 80. The positioning means includes a longitudinally extending shaft 112 which has an end adapted to engage the low pressure face 80a of the piston. The position of shaft 112 in the valve body 78 is adjusted by a slow close control member 114 that threadedly engages the housing. Escape of hydraulic fluid from the housing is prevented by an O-ring seal 116 on shaft 112. Shaft 112 may be driven against the piston 80 by the control member 114 to so position the piston that ball valve 88 will effectively close the port 90 thus preventing fluid from conduit 64 from entering the chamber 84 in the valve. By adjustment of the slow close control member 114 the valve 88 may be opened slightly to permit controlled flow of fluid through the port 90.

The electric drive motor 74 is connectable to source 118 of electrical energy by the operation of a relay 120 which has contacts 120a and 120b operatively connected thereto. Switch 56 that is operated by pin 50 on toggle 38 and a second switch 122, which is mounted on the breaker frame and which is operated by a portion of the controlled latch 24, are connected in series with the relay 120. The foregoing system is shown and described in detail in copending application Ser. No. 422,240 filed Dec. 30, 1964, entitled Energy Storage Mechanism for Actuating Circuit Breakers and the like which is assigned to the same assignee as the present invention.

Release mechanism 58 is used to drive the toggle 38 overcenter and includes a pair of spaced circular supports 200 carried by a shaft 202 journalled in plates 49. A curvilinear sector cam 204 is pivoted on a pin 206 between the supports 200. Pin 206 is located along a radius of the supports 200 between the periphery of the supports and the centrally located shaft 202. Sector cam 204 has an outer curved surface 208 for engagement with a roller 210 pivoted to link 40 of the toggle 38. Cam 204 also has an inner curved surface 212. The inner and outer surfaces are substantially parallel to one another and are interconnected by a substantially perpendicular surface 214 at the end of the cam opposite its pivot 206. A tension spring 216 is secured to face 214 at one end and to a pin 218 carried by the supports 200. Spring 216 pivots the sector cam 204 so that the inner surface 212 engages the shaft 202. When the shaft and the cam surface are in engagement the end 220 of the outer surface 208 projects beyond the periphery of the supports 200. The distance from the surface end 220 to the center of the pivot 206 is equal to the distance between the center of the pivot 206 and the diametrically opposed portion of the periphery of the support 200 so that the cam sector 204 when retracted has its end portion 220 at the periphery of the surface of the circular supports 200.

Figure 4:
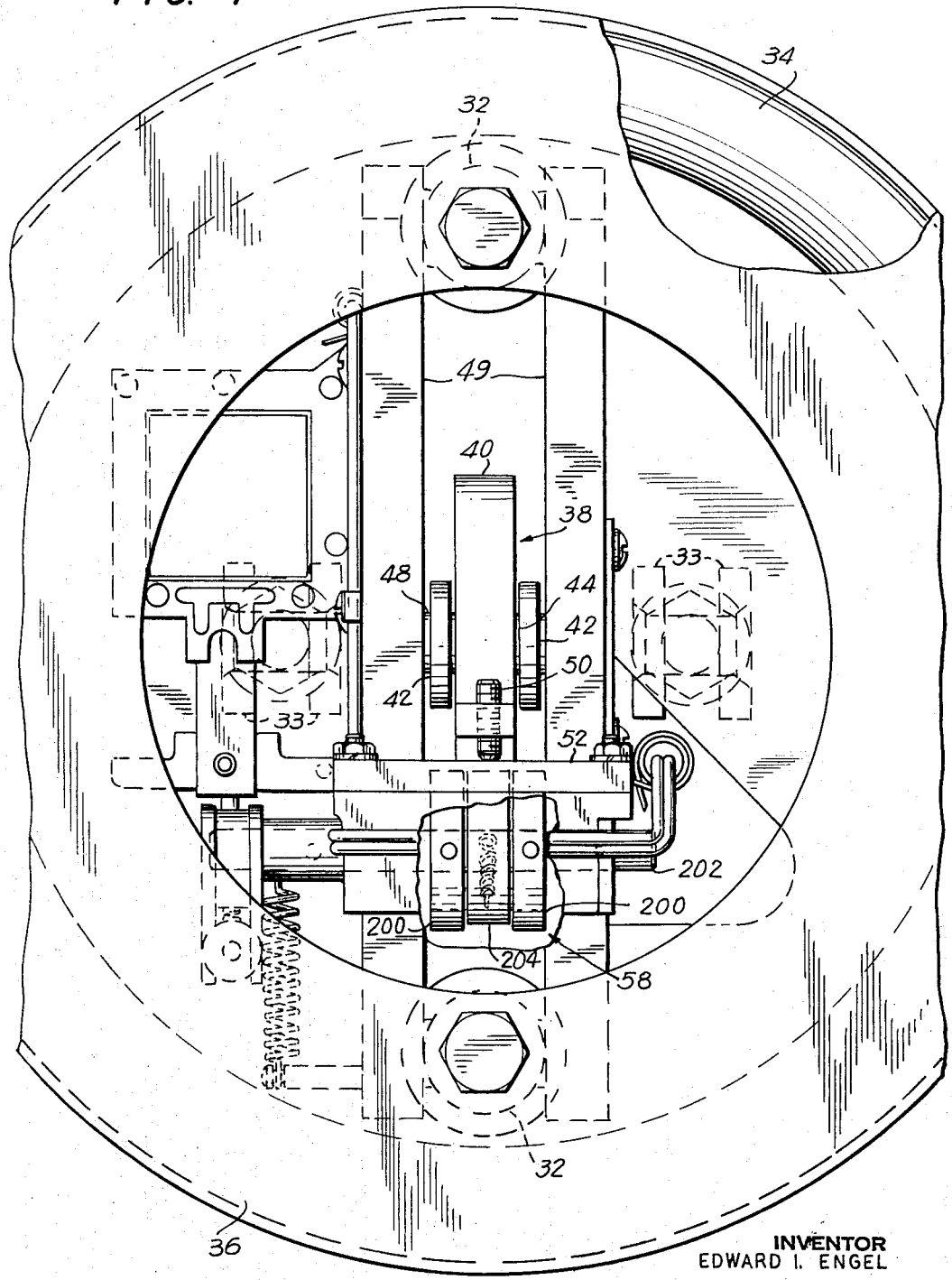
FIG. 4 is an end view on a greatly enlarged scale of the stored energy mechanism as viewed in the direction of the arrow 4 in FIG. 1.

Rotation of the release mechanism 58 may be produced by operation of a solenoid 222 or by manually operated means 224. Both the solenoid 222 and the manually operated means 224 engage a bell crank 226 secured to the shaft 202. Referring to FIG. 4 it will be noted that the solenoid and the operative portion of the manual means 224 are located within the volume defined by the turns of the energy storage spring 34. A return spring 228 is also secured to bell crank 226 for returning the release mechanism 58 to its rest or start position shown in FIG. 6 upon release of the manual means 224 or deactivation of the solenoid 222.

Referring to FIG. 6 et seq. it will be seen that when the release mechanism is rotated counterclockwise the sector cam 204 will be in a force transmitting relationship with the shaft 202 and is interposed between the shaft and the roller 210 carried by toggle link 240. The force transmitted to the toggle causes the knee of the toggle 44 to pass overcenter along the centers between pivots 48 and 46 releasing the energy stored in the spring 34 for the breaker closing operation to be described below. The release position is shown in FIG. 7.

The releasing of the toggle 38 results in the closing of the circuit breaker and the initiation of the recharging operation described above. The toggle linkage overcenters during the storage of energy in the spring 34. If the toggle overcenters before the release mechanism 38 is in the reset or start position of FIG. 6 then the sector cam 204 is deflected from its position of engagement with the shaft 202 and as the release mechanism rotates clockwise the only force transmitted against the roller 210 of the toggle linkage 238 is that produced by the elongation of spring 216. This force is insufficient to shift the toggle overcenter. This operation is illustrated in FIGS. 8, 9 and 10 which show how the roller engages the end surface 214 of the sector cam and rides over the end 220 of the cam on to the outer cam surface 208 during the reset, clockwise, rotation of the release mechanism 58. The deflective ability of the sector cam 204 provides antipump operation. Even though the solenoid 222 is kept energized or the manual release means 224 is held in the tripping or releasing position the toggle is able to overcenter. A deliberate motion through the complete clockwise and counterclockwise operation is necessary for the cam 204 to pass beyond the roller 210 in order to provide the lift of the toggle knee for the releasing operation.

For a more thorough understanding of the invention the operation of the energy storage mechanism will now be explained in detail. Referring to FIG. 1, energy storage spring 34 is shown fully extended at the start of the charging cycle just after a breaker closing operation. As the breaker mechanism assumed its closed circuit position the control latch 24 closed the normally open switch 122, completing the circuit through switch 56 thus causing relay 120 to be energized. Normally open relay contacts 120a and 120b are now closed. Contacts 120a maintain the circuit to the relay while contacts 120b connect the motor 74 to the power source 118. Motor 74 is energized driving gear pump 70 and piston pump 72. Low pressure gear pump 70 pumps hydraulic fluid from the reservoir 94 to the piston pump 72 through check valve 104 and to the low pressure chamber 86 of the control valve 76 through conduit 102. Hydraulic fluid at high pressure is forced by the piston pump through check valve 105 into passageway or conduit 64 and transmitted thereby to the jack 27. Flow of the high pressure fluid into the control valve 76 is prevented by ball valve 88a which is automatically closed by the low pressure fluid operating on the large face 80a of piston 80. The force produced on the large area of the low pressure side of the piston is greater than that produced on the small surface at the high pressure side thereby assuring a tight seal at port 90. The hydraulic fluid present in the vented chamber 84 at the start of the cycle is vented through port 92 to the reservoir 94 by the movement of the piston 80 and does not retard its movement. The fluid pressurization described causes the hydraulic jack 27 to extend ram 60 moving spring carriage 30 toward the end cap 36 thereby charging the spring 34. The one-way driving connection between the stored energy mechanism and the breaker, which includes driving member 20 and controlled latch 24, allows the spring 34 to be charged without disturbing the breaker. As the carriage 30 withdraws the driving member 20 is retracted leaving the controlled latch 24 in engagement with the prop 26 which maintains circuit breaker closed. Equipment constructed according to the present invention has a charging time of three seconds. When the spring 34 is fully charged (FIG. 2) toggle 38 is overcentered and pin 50 opens switch 56 thereby opening the circuit to motor 74. The de-energization of the motor automatically relieves the pressure in both the high and low pressure portions of the system 12 since it is the presence of low pressure fluid in valve chamber 86 that seals off the high pressure system. The pressure is relieved by clearance provided in the low pressure gear pump. The stored energy mechanism 10 is now ready for the next closing operation of the breaker. (The breaker is opened by the release of the controlled latch member 24 (see Patent No. 3,097,275) at which time the breaker parts assume the position shown in FIG. 2.)

The breaker closing operation is initiated by the release mechanism 58 which lifts the knee of the toggle 44 overcenter. When the toggle 38 overcenters, the energy stored in the spring 34 is available to drive carriage 30, and through links 33, drive the member 20 in a closing stroke toward the position shown in FIG. 1. The discharge time is approximately .02 second. The hydraulic fluid present in the jack 27 is vented to the reservoir 94 through the control valve 76 since the path through the piston pump 72 is blocked by check valve 105. In the absence of low pressure on piston 80 it is shiftable to a position of clearance by the force generated by the fluid being vented from the jack through conduit 64. Port 90 is opened by the movement of the piston and fluid from the jack is then able to flow through valve 76 and through port 92 to conduit 96 to the reservoir 94. Fluid in the low pressure chamber 86 of the valve is displaced by the movement of piston 80 back through the conduit 106 and through the gear pump 70 to the reservoir 94. Bypass valve 110 allows the displaced fluid to bypass the gear pump in the event that a pressure buildup occurs in the gear pump 70. Normally, the small amount of fluid in the low pressure chamber is able to pass through the gear pump with ease.

In the foregoing, the discharge of the spring 34 and the closing operation of the breaker 16 is unimpeded by the control valve 76. If controlled closing of the breaker is desired, piston 80 may be held in the port 90 blocking position to thereby prevent or control escape of the fluid from the piston. In this case although the spring 34 has been released by the toggle 38, which has been moved overcenter by operating mechanism 58, the breaker will not close nor will the energy stored in the spring 34 be discharged. Piston 80 is held in the port blocking position by the shaft 112 which is driven against it by the slow close control 114. Gradual closing of the breaker may be achieved by allowing slow flow of fluid through the port 90 past the ball valve 88. This is accomplished by operating the slow close control 114 to allow piston 80 to shift thereby allowing the venting of the oil from the conduit 64 and the hydraulic jack 27. Check valve 105 and excess pressure relief valve 98 assure that the jack fluid can vent only through the control valve 76. Relief valve 98 prevents dangerous excess pressures from occurring during the closing operation as well as during the charging operation. In this mode of operation control valve 76 may be utilized to stop the breaker mechanism at any point in the closing stroke so that the closing sequence of the contacts 18 may be studied and adjusted.

It will be noted from the foregoing that in the normal operation of the system the fluid pressure used to charge spring 34 is released automatically, when the spring is fully charged by the cessation of operation of motor 74, without reliance on any mechanism other than the presence or absence of low pressure generated by the operation of the gear pump.

Referring to the drawings and in particular FIGS. 1, 2 and 4, it will be seen that the jack 27 which transmits the energy to be stored in the spring 34, the toggle 38 and the release mechanism 58 are all contained within the volume defined by the discharged condition of the energy storage spring 34. This provides an extremely compact energy storage mechanism particularly suited for use with circuit breakers where space utilization is at a premium.

While only one embodiment of the invention has been shown and described herein, it will be obvious to those skilled in the art that various modifications and changes may be made herein without departing from the spirit and scope of the invention.

What is claimed is:

1. A stored energy mechanism for operating a circuit breaker including spring means for storing the operating energy, said spring means defining a given volume in the discharged position thereof, means for transmitting to said spring the energy to be stored in said spring in response to externally generated forces, means for releasably restraining said spring means in the charged position thereof, and means for releasing the restraining means, said energy transmitting means, said releasable restraining means, and said releasing means being mounted within said given volume of said spring means, and means operatively connecting said spring means to the circuit breaker for the operation thereof.

2. A stored energy mechanism according to claim 1 wherein said mechanism includes a plurality of spaced members secured at one end to said circuit breaker, carriage means slidably mounted on said members, an end plate secured to the free ends of said members, and a helical spring reacting between said carriage and said end plate, said energy transmitting means being operatively connected to said carriage means, and said means operatively connecting said spring means to said circuit breaker including said carriage means.

3. A stored energy mechanism according to claim 2 wherein said restraining means reacts between said carriage means and the remote ends of said spaced members.

4. A stored energy mechanism according to claim 1 wherein said restraining means includes an overcentering toggle linkage formed of a pair of links pivotally joined together at a knee, one link of said toggle being pivoted to said carriage means and the other link being pivoted to opposed supports secured adjacent the free ends of said spaced members, said toggle being overcentered to restrain said spring means in the charged position thereof, and said releasing means including means for reversely shifting said toggle overcenter to release said spring means.

5. Energy storage mechanism according to claim 1 wherein said releasing means includes a pair of circular side members of a given diameter coaxially mounted on a rotatable shaft, a curvilinear sector cam interposed between said circular side members and pivoted thereto for conjoint rotation at a point between the center of said circular side members and the periphery thereof, said curvilinear cam having the same diameter as said side members, means resiliently urging said cam member against said shaft so that a portion protrudes beyond the periphery of said side members, said cam when in engagement with said shaft fixing said cam in position to release said restraining means in one direction of rotation of said shaft, said cam being deflectable away from said shaft in the return motion of said shaft to thereby provide a one-way driving connection to said restraining means, and means for rotating said shaft.

6. A stored energy mechanism for operating a circuit breaker including spring means for storing the operating energy therefor, said energy storage mechanism including a plurality of spaced members secured at one end to said circuit breaker, carriage means slidably mounted on said members, an end plate secured to the free ends of said spaced members, a helical spring reacting between said carriage and said end plate, means for transmitting to said spring the energy to be stored in said spring in response to externally generated forces, said transmitting means being connected to said carriage for shifting said carriage along said spaced members from a discharged position of said spring to a charged position, means for releasably restraining said spring means in its charged position, said restraining means including a toggle linkage formed of a pair of links pivotally joined together at a knee, one link of said toggle being pivoted to said carriage means and the other link being pivoted to opposed supports secured to said spaced members adjacent said end plate, said toggle being overcentered to restrain said spring means in the charged position thereof, means for releasing the restraining means including a pair of circular side members of a given diameter coaxially mounted on a rotatable shaft journalled in said opposed supports, a curvilinear sector cam interposed between said circular side members and pivoted thereto for conjoint rotation at a point between the center of said circular side members and the periphery thereof, said curvilinear cam member having the same diameter as said side members, means resiliently urging said cam member against said shaft so that a portion thereof protrudes beyond the periphery of said side members, said cam when in engagement with said shaft fixing said cam in position to engage said toggle for driving said toggle overcenter in the releasing direction in one direction of rotation of said shaft, said cam being deflectable away from said shaft in the return motion of said shaft to thereby provide a one-way driving connection to said toggle, means for rotating said shaft to effect said release of said restricting means, and means operatively connecting said carriage means to the circuit breaker for the operation thereof, said energy storing spring means defining a given volume in the discharged position thereof, said energy transmitting means, said releasable restraining means, and said releasing means being mounted within said given volume.

References Cited
UNITED STATES PATENTS

| 2,308,731 | 1/1943 | White. | |
| 2,624,424 | 1/1953 | Kliewer | 185—40 |
| 2,868,330 | 1/1959 | Caswell | 185—37 |
| 2,985,739 | 5/1961 | Umphrey et al. | 200—82 XR |

EDGAR W. GEOGHEGAN, *Primary Examiner.*